L. H. JACOBS.
TRACE FASTENER.
APPLICATION FILED JUNE 26, 1912.
1,053,820.
Patented Feb. 18, 1913.
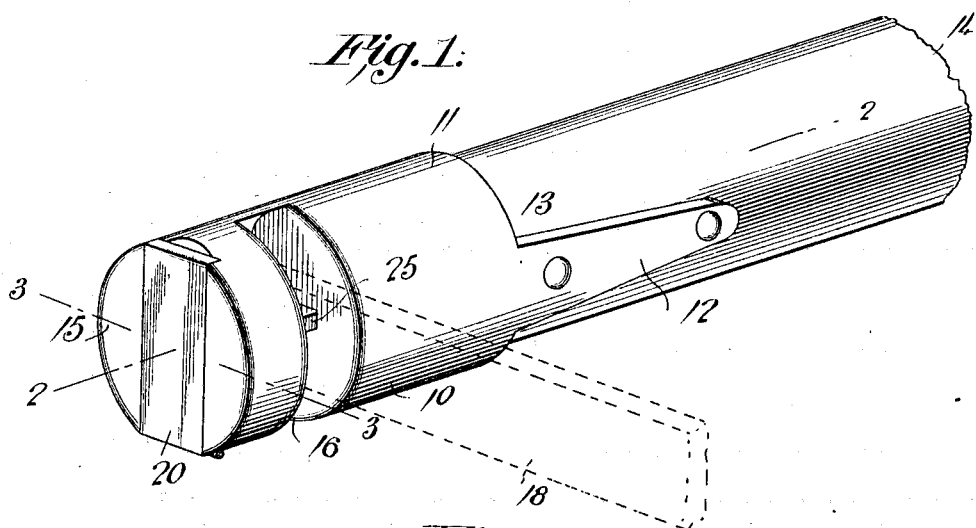
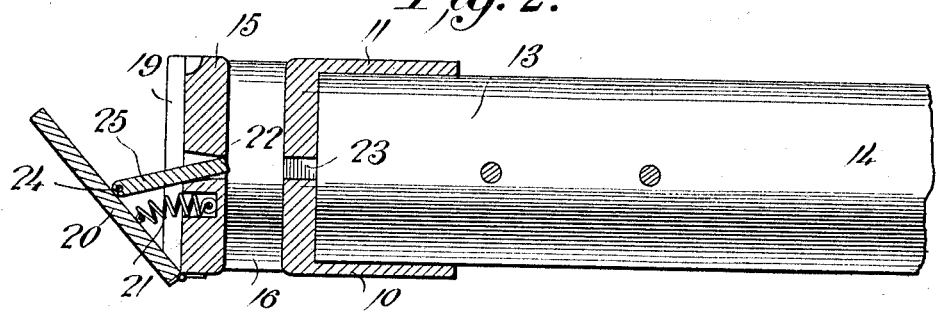
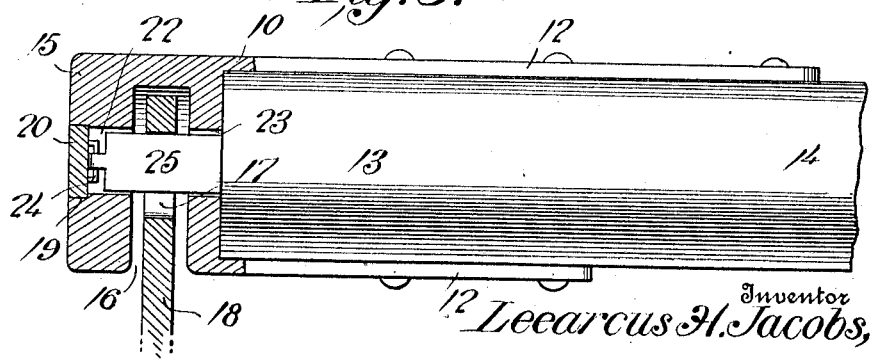

UNITED STATES PATENT OFFICE.

LEEARCUS H. JACOBS, OF IVAN, ARKANSAS.

TRACE-FASTENER.

1,053,820.  Specification of Letters Patent.  Patented Feb. 18, 1913.

Application filed June 26, 1912. Serial No. 706,066.

*To all whom it may concern:*

Be it known that I, LEEARCUS H. JACOBS, a citizen of the United States, residing at Ivan, in the county of Dallas and State of Arkansas, have invented new and useful Improvements in Trace-Fasteners, of which the following is a specification.

An object of the invention is to provide a device for releasably securing a trace to a swingletree.

The invention embodies, among other features, a fastener adapted for connection with one end of a swingletree, a similar fastener being connected to the other end of the swingletree for releasably securing the ends of traces or the cockeyes thereof to the swingletree, the devices being arranged so that the traces or cockeyes can be easily and quickly released from connection with the swingletree.

In the further disclosure of the invention reference is to be had to the accompanying drawings constituting a part of this specification, in which similar characters of reference denote corresponding parts in all the views, and in which:

Figure 1 is a fragmentary perspective view showing one end of a swingletree having my device attached thereto; Fig. 2 is a longitudinal sectional view taken on the line 2—2 in Fig. 1, showing the locking member in open position; and Fig. 3 is a longitudinal sectional view taken on the line 3—3 in Fig. 1.

Referring more particularly to the views, I employ a body 10, preferably formed of a single casting embodying a socket 11 provided with tongues 12, the socket 11 being adapted to receive the end 13 of a swingletree 14 with the tongues 12 projecting over the end 13 of the swingletree and secured thereto by suitable bolts or rivets.

The body 10 is provided with an integral head 15, a slot 16 being formed in the body 10 between the socket 11 and the head 15 to receive therein the cockeye 17 of a trace 18. A recess 19 is formed in the head 15 and an end of a plate 20 has hinged connection with the head 15 so that the plate, when in normal position in the recess 19, will be flush with the end of the head 15, a contractile spring 21 having an end thereof secured to the head 15 and the other end thereof secured to the under side of the plate 20 to normally retain the plate in the recess 19. Slots 22, 23 are formed in the head 15 and an end of the socket 11 respectively, and secured to the under side of the plate 20 is a traveler bar 24 on which is mounted to swing a pin 25 adapted to extend through the slots 22, 23, the said pin thus being adapted to extend through the slot 16 formed in the body 10 between the socket 11 and the head 15, the slots 22, 23 being elongated and the pin 25 being also preferably elongated in cross sectional area to easily slide in the mentioned slots, the said slots being sufficiently large to permit the pin to easily slide therein and also act as guideways for the pin.

In the use of my device, one of the fasteners is preferably secured to each end of the swingletree and when it is desired to secure the cockeye 17 of the trace 18 to the fastener, a downward pull is exerted on the free end of the plate 20, thus swinging the plate against the action of the spring 21 to remove the free end of the pin 25 from the plane of the slot 16, after which the cockeye is inserted in the slot 16 and the plate 20 is then released, thus causing the plate to be returned to normal position in the recess 19 by the action of the spring 21, thus also returning the pin 25 to normal position to extend through the slot 16 and also through the cockeye 17 to secure the cockeye to the fastener. When it is desired to release the cockeye from the fastener, an outward pull is exerted on the free end of the plate 20, thus removing the pin from the plane of the slot 16 and the pull exerted by the draft animal on the trace will be sufficient to pull the cockeye out of engagement with the body 10, the pin 25 being substantially held in horizontal position at all times in view of the pivotal connection of the pin with the plate 20 and the particular arrangement of the slots 22, 23, the walls of which form guideways for the pin to aid in retaining the pin in horizontal position relatively to the body 10. The plate 20 is preferably arranged to fit flush with the head 15 of the body 10, as mentioned heretofore, in order that the plate will not be deranged or pulled out of position when the ends of the swingletree come in contact with underbrush, the limbs or twigs of which would tend to catch hold of the plate and remove the same from its normal position if an edge of the plate were permitted to protrude beyond the edges of the head 15.

Having thus described my invention, I claim:

1. In a device of the class described, the combination with a body, of a socket formed therewith, a head formed on the said body, the said head being spaced from the socket to provide a slot between the head and said socket, means for securing the body to an end of a swingletree, a plate mounted to swing on the said head and adapted to normally lie in a recess in the head, a spring secured to the said head and to the said plate to normally retain the said plate in the said recess, and a pin mounted to swing on the inner side of the said plate and adapted to normally extend through the slot between the said head and the said socket and through slots formed in the said head and the said socket.

2. In a device of the class described, the combination with a body, of a socket formed therewith, a head formed on the said body, the said head being spaced from the said socket to provide a slot therebetween, means for securing the said body to an end of a swingletree, a plate mounted to swing on the said head, a spring secured to the said head and to the said plate to normally retain the free end of the said plate in engagement with the said head, a traveler bar secured to the under side of the said plate, and a pin mounted to swing on the said traveler bar and adapted to normally extend through the slot between the said head and the said socket and through slots formed in the said head and the said socket.

In testimony whereof I affix my signature in presence of two witnesses.

LEEARCUS H. JACOBS.

Witnesses:
 JNO. W. GARNER,
 W. M. MORGAN.

---

Copies of this patent may be obtained for five cents each, by addressing the "Commissioner of Patents, Washington, D. C."